United States Patent
Yoshihisa et al.

(10) Patent No.: US 6,850,028 B2
(45) Date of Patent: Feb. 1, 2005

(54) MOTOR DRIVER AND RECORDING APPARATUS INCORPORATING THE SAME

(75) Inventors: Yasuhiko Yoshihisa, Nagano (JP); Koichiro Yokoyama, Nagano (JP); Tsunenobu Endo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 10/388,174

(22) Filed: Mar. 14, 2003

(65) Prior Publication Data

US 2003/0214550 A1 Nov. 20, 2003

(30) Foreign Application Priority Data

| Mar. 14, 2002 | (JP) | P2002-069556 |
| Mar. 14, 2002 | (JP) | P2002-069557 |
| May 31, 2002 | (JP) | P2002-160243 |
| Mar. 3, 2003 | (JP) | P2003-055999 |

(51) Int. Cl.[7] .................................................. H02P 8/00
(52) U.S. Cl. ....................... 318/696; 318/685; 318/445; 318/468
(58) Field of Search ................................ 318/696, 685, 318/445, 466, 468, 200; 347/32

(56) References Cited

U.S. PATENT DOCUMENTS 5,783,939 A * 7/1998 Lippmann et al. ...... 324/154 R
6,274,996 B1 8/2001 Wada
6,309,044 B1 * 10/2001 Gaarder ........................ 347/32
6,474,774 B1 * 11/2002 Okamoto ....................... 347/32

FOREIGN PATENT DOCUMENTS

| EP | 0 311 095 A2 | 4/1989 |
| EP | 0 322 386 A1 | 6/1989 |
| EP | 0 880 224 A2 | 11/1998 |
| JP | 10-323090 A | 4/1998 |
| JP | 2000-272190 A | 10/2000 |
| JP | 2001-002281 A | 1/2001 |

* cited by examiner

Primary Examiner—Karen Masih
(74) Attorney, Agent, or Firm—Sughrue Mion, PLLC

(57) ABSTRACT

A first current supplier supplies a first current to a first phase coil of a motor. A second current supplier supplies a second current to a second phase coil of the motor. A current selector selects a value of the first current and a value of the second current, so as to make constant at least one of a magnitude of a synthetic vector obtained by the selected value of the first current and the selected value of the second current at every microstep driving step of the motor, and an angular interval between synthetic vectors corresponding to adjacent microstep driving steps of the motor.

6 Claims, 16 Drawing Sheets

FIG. 5A

| | CURRENT RATE | |
|---|---|---|
| | A-PHASE | B-PHASE |
| 1 | 73.91 | 73.91 |
| 2 | 78.26 | 69.56 |
| 3 | 82.81 | 60.87 |
| 4 | 86.95 | 52.17 |
| 5 | 91.30 | 43.48 |
| 6 | 96.56 | 34.78 |
| 7 | 100.00 | 26.08 |
| 8 | 100.00 | 17.39 |
| 9 | 100.00 | 0.00 |
| 10 | 100.00 | -17.39 |
| 11 | 100.00 | -26.08 |
| 12 | 95.65 | -34.78 |
| 13 | 91.30 | -43.48 |
| 14 | 86.95 | -52.17 |
| 15 | 82.51 | -60.87 |
| 16 | 78.28 | -59.56 |
| 17 | 73.91 | -73.91 |
| 18 | 69.56 | -78.26 |
| 19 | 60.87 | -82.61 |
| 20 | 52.17 | -86.95 |
| 21 | 43.48 | -91.30 |
| 22 | 34.78 | -95.65 |
| 23 | 26.08 | -100.00 |
| 24 | 17.39 | -100.00 |
| 25 | 0.00 | -100.00 |
| 26 | -12.39 | -100.00 |
| 27 | -26.08 | -100.00 |
| 28 | -34.78 | -95.65 |
| 29 | -43.48 | -91.30 |
| 30 | -62.17 | -86.95 |
| 31 | -60.87 | -82.61 |
| 32 | -69.56 | -78.26 |
| 33 | -73.91 | -73.91 |
| 34 | -78.26 | -69.56 |
| 35 | -82.61 | -60.87 |
| 36 | -88.95 | -52.17 |
| 37 | -91.30 | -43.48 |
| 38 | -95.65 | -34.78 |
| 39 | -100.00 | -26.08 |
| 40 | -100.00 | -17.39 |
| 41 | -100.00 | 0.00 |
| 42 | -100.00 | 17.39 |
| 43 | -100.00 | 26.08 |
| 44 | -95.65 | 34.78 |
| 45 | -91.30 | 43.48 |
| 46 | -86.95 | 52.17 |
| 47 | -82.61 | 50.87 |
| 48 | -78.26 | 69.56 |
| 49 | -73.91 | 73.81 |
| 50 | -69.56 | 78.26 |
| 51 | -60.87 | 82.81 |
| 52 | -52.17 | 86.95 |
| 53 | -43.48 | 91.30 |
| 54 | -34.78 | 95.65 |
| 55 | -26.08 | 100.00 |
| 56 | -17.59 | 100.00 |
| 57 | 0.00 | 100.00 |
| 58 | 17.39 | 100.00 |
| 59 | 26.08 | 100.00 |
| 60 | 34.78 | 95.85 |
| 61 | 43.48 | 91.30 |
| 62 | 52.17 | 88.95 |
| 63 | 60.87 | 82.61 |
| 64 | 69.56 | 78.26 |

FIG. 5B

| | CURRENT RATE | |
|---|---|---|
| | A-PHASE | B-PHASE |
| 1 | 69.56 | 69.56 |
| 2 | 73.91 | 60.87 |
| 3 | 78.26 | 52.17 |
| 4 | 82.61 | 43.48 |
| 5 | 82.61 | 34.78 |
| 6 | 86.95 | 26.08 |
| 7 | 86.95 | 17.39 |
| 8 | 100.00 | 17.39 |
| 9 | 100.00 | 0.00 |
| 10 | 100.00 | -17.39 |
| 11 | 86.95 | -17.39 |
| 12 | 86.95 | -26.08 |
| 13 | 82.61 | -34.78 |
| 14 | 82.61 | -43.48 |
| 15 | 78.26 | -52.17 |
| 16 | 73.91 | -60.87 |
| 17 | 69.56 | -69.56 |
| 18 | 60.87 | -73.91 |
| 19 | 52.17 | -78.25 |
| 20 | 43.48 | -82.61 |
| 21 | 34.78 | -82.61 |
| 22 | 26.08 | -86.95 |
| 23 | 17.39 | -86.95 |
| 24 | 17.39 | -100.00 |
| 25 | 0.00 | -100.00 |
| 26 | -17.39 | -100.00 |
| 27 | -17.39 | -86.95 |
| 28 | -26.08 | -88.95 |
| 29 | -34.78 | -82.51 |
| 30 | -43.48 | -82.61 |
| 31 | -52.17 | -78.26 |
| 32 | -60.87 | -73.91 |
| 33 | -69.56 | -69.56 |
| 34 | -73.91 | -80.87 |
| 35 | -78.26 | -52.17 |
| 36 | -82.61 | -43.48 |
| 37 | -82.51 | -34.78 |
| 38 | -86.95 | -26.08 |
| 39 | -86.95 | -17.39 |
| 40 | -100.00 | -17.39 |
| 41 | -100.00 | 0.00 |
| 42 | -100.00 | 17.39 |
| 43 | -86.95 | 17.39 |
| 44 | -86.95 | 26.08 |
| 45 | -82.61 | 34.78 |
| 46 | -82.61 | 43.48 |
| 47 | -78.26 | 52.17 |
| 48 | -73.91 | 60.87 |
| 49 | -69.56 | 69.56 |
| 50 | -60.87 | 73.91 |
| 51 | -52.17 | 78.26 |
| 52 | -43.48 | 82.61 |
| 53 | -34.78 | 82.61 |
| 54 | -26.08 | 86.95 |
| 55 | -17.39 | 86.95 |
| 56 | 17.39 | 100.00 |
| 57 | 0.00 | 100.00 |
| 58 | 17.39 | 100.00 |
| 59 | 17.39 | 86.95 |
| 60 | 26.08 | 86.95 |
| 61 | 34.78 | 82.61 |
| 62 | 43.48 | 82.61 |
| 63 | 52.17 | 78.26 |
| 64 | 60.87 | 73.91 |

FIG. 5C

| | CURRENT RATE | | Vref 3 |
|---|---|---|---|
| | A-PHASE | B-PHASE | |
| 1 | 69.56 | 69.56 | 0.98 |
| 2 | 73.91 | 60.87 | 0.95 |
| 3 | 78.26 | 52.17 | 0.94 |
| 4 | 82.61 | 43.48 | 0.93 |
| 5 | 82.61 | 34.78 | 0.90 |
| 6 | 86.95 | 26.08 | 0.91 |
| 7 | 86.95 | 17.39 | 0.89 |
| 8 | 100.00 | 17.39 | 1.02 |
| 9 | 100.00 | 0.00 | 1.00 |
| 10 | 100.00 | -17.39 | 1.02 |
| 11 | 86.95 | -17.39 | 0.89 |
| 12 | 86.95 | -26.08 | 0.91 |
| 13 | 82.61 | -34.78 | 0.90 |
| 14 | 82.61 | -43.48 | 0.93 |
| 15 | 78.26 | -52.17 | 0.94 |
| 16 | 73.91 | -60.87 | 0.95 |
| 17 | 69.56 | -69.56 | 0.98 |
| 18 | 60.87 | -73.91 | 0.96 |
| 19 | 52.17 | -78.25 | 0.94 |
| 20 | 43.48 | -82.61 | 0.93 |
| 21 | 34.78 | -82.61 | 0.90 |
| 22 | 26.08 | -86.95 | 0.91 |
| 23 | 17.39 | -86.95 | 0.89 |
| 24 | 17.39 | -100.00 | 1.02 |
| 25 | 0.00 | -100.00 | 1.00 |
| 26 | -17.39 | -100.00 | 1.02 |
| 27 | -17.39 | -86.95 | 0.89 |
| 28 | -26.08 | -86.95 | 0.91 |
| 29 | -34.78 | -82.51 | 0.90 |
| 30 | -43.48 | -82.61 | 0.93 |
| 31 | -52.17 | -78.26 | 0.94 |
| 32 | -60.87 | -73.91 | 0.96 |
| 33 | -69.56 | -69.56 | 0.98 |
| 34 | -73.91 | -60.87 | 0.96 |
| 35 | -78.26 | -52.17 | 0.94 |
| 36 | -82.61 | -43.48 | 0.93 |
| 37 | -82.61 | -34.78 | 0.90 |
| 38 | -86.95 | -26.08 | 0.91 |
| 39 | -86.95 | -17.39 | 0.89 |
| 40 | -100.00 | -17.39 | 1.02 |
| 41 | -100.00 | 0.00 | 1.00 |
| 42 | -100.00 | 17.39 | 1.02 |
| 43 | -86.95 | 17.39 | 0.89 |
| 44 | -86.95 | 26.08 | 0.91 |
| 45 | -82.61 | 34.78 | 0.90 |
| 46 | -82.61 | 43.48 | 0.93 |
| 47 | -78.26 | 52.17 | 0.94 |
| 48 | -73.91 | 60.87 | 0.96 |
| 49 | -69.56 | 69.56 | 0.98 |
| 50 | -60.87 | 73.91 | 0.95 |
| 51 | -52.17 | 78.26 | 0.94 |
| 52 | -43.48 | 82.61 | 0.93 |
| 53 | -34.78 | 82.61 | 0.90 |
| 54 | -26.08 | 86.95 | 0.91 |
| 55 | -17.39 | 86.95 | 0.89 |
| 56 | -17.39 | 100.00 | 1.02 |
| 57 | 0.00 | 100.00 | 1.00 |
| 58 | 17.39 | 100.00 | 1.02 |
| 59 | 17.39 | 86.95 | 0.89 |
| 60 | 26.08 | 86.95 | 0.91 |
| 61 | 34.78 | 82.61 | 0.90 |
| 62 | 43.48 | 82.61 | 0.93 |
| 63 | 52.17 | 78.26 | 0.94 |
| 64 | 60.87 | 73.91 | 0.96 |

FIG. 15

| Bit 4 | Bit 3 | Bit 2 | LSB | Current Ratio (%) |
|---|---|---|---|---|
| 1 | 1 | 1 | 1 | 100.0 |
| 1 | 1 | 1 | 0 | 95.65 |
| 1 | 1 | 0 | 1 | 91.30 |
| 1 | 1 | 0 | 0 | 86.95 |
| 1 | 0 | 1 | 1 | 82.61 |
| 1 | 0 | 1 | 0 | 78.28 |
| 1 | 0 | 0 | 1 | 73.91 |
| 1 | 0 | 0 | 0 | 89.68 |
| 0 | 1 | 1 | 1 | 60.87 |
| 0 | 1 | 1 | 0 | 52.17 |
| 0 | 1 | 0 | 1 | 43.48 |
| 0 | 1 | 0 | 0 | 34.78 |
| 0 | 0 | 1 | 1 | 26.08 |
| 0 | 0 | 1 | 0 | 17.39 |
| 0 | 0 | 0 | 1 | 0 |
| 0 | 0 | 0 | 0 | Disabled |

МОТОR DRIVER AND RECORDING APPARATUS INCORPORATING THE SAME

BACKGROUND OF THE INVENTION

The present invention relates to a system for driving a motor and a recording apparatus provided with the motor driver.

Generally, an ink jet printer which is one of recording apparatuses is configured so that a sheet which is a record medium and which is set on a sheet feeding tray is fed by a feeder, and information is recorded on the sheet by a recording head mounted on a carriage reciprocated in a main scanning direction. The sheet is intermittently fed by a set amount in a subscanning direction by a transporter. The ink jet printer is configured so that the feeder and the transporter are driven by a sheet feeding motor, the carriage is driven by a carriage motor, and the sheet feeding motor and the carriage motor are driven by a motor driver which is disclosed in Japanese Patent Publication No. 10-323090A, for example.

In the sheet feeding motor and the carriage motor respectively arranged in the ink jet printer, the halt phase of each rotor is a so-called two-phase excitation position at which the rotor is excited by both coils of an A-phase and a B-phase, the resolution of each motor is determined depending upon the number of poles. That is, to enhance the resolution of each motor, the number of poles is required to be increased, however, there is a mechanical limit to such increase.

In the motor driver arranged in the ink jet printer, a D/A (digital to analog) converter having the resolution of 4 bits (see FIG. 15) is provided with respect to each of the A-phase and the B-phase to select one value VREF which determines current ratio of each phase to be supplied. The selection is performed such that the output torque of the motor is made constant.

Specifically, the magnitude of the output torque is represented as a synthetic vector of each current value of the A-phase and the B-phase. In a case where the motor is subjected to the W1-2phase excitation driving, each current value of the A-phase and the B-phase is varied and supplied so that a locus of the end of the synthetic vector draws a circle shown in FIG. 16.

However, as an angular interval of a vector movement on the locus at every step driving is not fixed when a current selecting circuit is selected based upon one specific value of VREF so that a circle is drawn, the precision of a halt angle is deteriorated. On the other hand, as the magnitude of the vector is not fixed when the current selecting circuit is selected so that the angular intervals of the vector movement is fixed, the precision of a halt angle is similarly deteriorated.

The motor driver arranged in the ink jet printer varies current to be supplied between, for example, 500 and 1000 mA independently with respect to the A-phase and the B-phase so that the output torque of the motor is fixed. That is, each current value of the A-phase and the B-phase is varied and supplied so that a locus of the end of the synthetic vector draws a circle shown in FIG. 16. As explained previously, the magnitude of the output torque of the motor is represented as a synthetic vector of each current value of the A-phase and the B-phase.

As magnetic attraction force for overcoming the loss of torque (load imposed on the rotor) is exercised in the two-phase excitation position, the rotor is halted at angles shown by upper points in FIG. 17. On the other hand, as the magnetic attraction force is smaller at a one-phase excitation position than that at the attraction in the two-phase excitation position, the rotor is halted at angles shown by lower points in FIG. 17. It is apparent that the angles at which the rotor is halted are dispersed as shown in FIG. 17. An angle between adjacent two-phase excitation positions is 7.5 degrees, and an angle to one-phase excitation position which is located in the middle of the two-phase excitation positions is 3.75 degrees.

SUMMARY OF THE INVENTION

It is therefore an object of the invention to provide a motor driver that can enhance the resolution of a motor and can enhance the precision of an angle at which a rotor is halted, and a recording apparatus incorporating such a motor driver.

In order to achieve the above object, according to the invention, there is provided a motor driver, comprising:

a first current supplier, which supplies a first current to a first phase coil of a motor, a second current supplier, which supplies a second current to a second phase coil of the motor; and a current selector, which selects a value of the first current and a value of the second current, so as to make constant at least one of:

a magnitude of a synthetic vector obtained by the selected value of the first current and the selected value of the second current at every microstep driving step of the motor, and an angular interval between synthetic vectors corresponding to adjacent microstep driving steps of the motor.

In such a configuration, the halt angle of the rotor can be made accurate while enhancing the step resolution of the motor.

According to the invention, there is also provided a motor driver, comprising:

a first current supplier, which supplies a first current to a first phase coil of a motor;

a second current supplier, which supplies a second current to a second phase coil of the motor; and a current selector, which performs at least one of:

increasing one of the first current and the second current for one-phase excitation to vary a magnetic balance obtained by the first current or the second current; and decreasing both of the first current and the second current for two-phase excitation to vary a magnetic balance obtained by the first current and the second current.

In such a configuration, a magnetic attraction force for overcoming the loss of torque can be exercised even when a rotor is situated at a one-phase excitation position.

Furthermore, a magnetic attraction force at a one-phase excitation position and that at a two-phase excitation position can be balanced.

According to the invention, there is also provided a motor driver, comprising:

a first pulse supplier, which supplies first pulses for microstep-driving a rotor of a motor to place at a one-phase excitation position;

a second pulse supplier, which supplies second pulses for microstep-driving the rotor at a two-phase excitation position; and a drive controller, which controls the first pulse supplier and the second pulse supplier so as to perform at least one of:

increasing the number of the first pulses to be supplied during a predetermined cycle; and decreasing the number of the second pulses to be supplied during the predetermined cycle.

In such a configuration, the direction of the synthetic vector can be corrected at both of the first-phase excitation position and the second-phase excitation position.

According to the invention, there is also provided a motor driver, comprising:

a pulse supplier, which supplies pulses for microstep-driving a rotor of a motor to place at a one-phase excitation position; and a drive controller, which controls the pulse supplier so as to supply a first number of the pulses for driving the motor in a first direction, to supply a second number of the pulses for driving the motor in a second direction opposite to the first direction, and to supply a third number of the pulses for driving the motor in the first direction again.

In such a configuration, the direction of the synthetic vector at the first-phase excitation position can be corrected by the damping operation.

According to the invention, there is also provided a recording apparatus, comprising the above motor driver to drive a first motor, which moves a carriage on which a recording head is mounted, and a second motor, which transports a recording medium on which the recording head performs recording.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 5A to 5C are tables showing a concrete example of current values of a A-phase and a B-phase of a motor;

FIG. 15 shows the setting of D/A converter of a related-art motor driver;

DETAILED DESCRIPTION OF THE PREFERRED EMBODIMENTS

Preferred embodiments of the invention will be described below in detail with reference to accompanying drawings.

Figure 1:
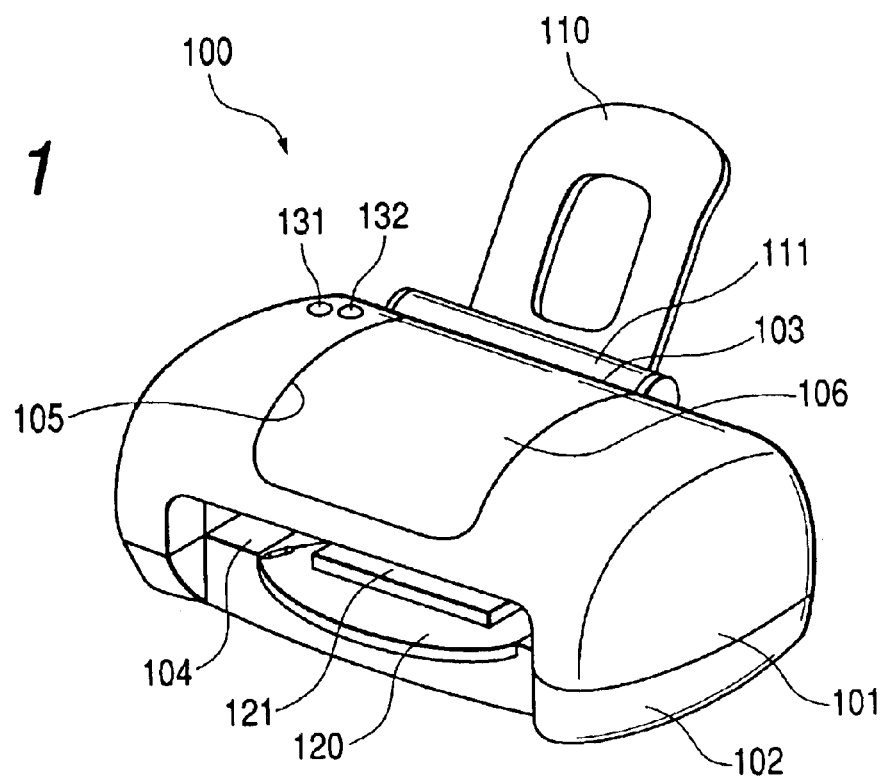
FIG. 1 is a perspective view showing the whole exterior configuration of an ink jet printer, viewed from the front side.

As shown in FIG. 1, an ink jet printer 100 which is one of recording apparatuses comprises an upper housing 101 and a lower housing 102. The upper housing 101 and the lower housing 102 are engaged with each other by snap fitting.

On the rear side of the upper housing 101, a sheet feeding port 103 is formed. In this sheet feeding port 103, a sheet feeding tray 110 on which sheets to be supplied are stacked is attached. The sheet feeding tray 110 is attached so as to protrude to the diagonally upper backside, and holds the sheets in a slanting state.

On the front side of the upper housing 101, a sheet ejection port 104 is formed. On the front sides of the upper housing 101 and lower housing 102, a stacker 120 on which the ejected sheets are stacked is provided. The stacker 120 is attached to the front side of the sheet ejection port 104. When the stacker 120 is not used, it is housed inside the sheet ejection port 104 (FIG. 1 shows this state). When it is used, it is pulled from the sheet ejection port 104, and stops at a position where it protrudes from the lower housing 102 to the diagonally upper front side to receive the sheet in the slanting state. The stacker 120 is provided with a holder 121 which supports a trailing end of an ejected sheet A window 105 is formed from the upper portion of the upper housing 101 to the front surface thereof. This window 105 is covered with a transparent or semitransparent openable cover 106. By opening this cover 106, an exchanging work of ink cartridge and a maintenance work of the internal mechanism can be readily performed. Further, a push button type of power switch 131 and operational switches 132, 133 are provided on the left backside of the upper housing 101.

Figure 2:
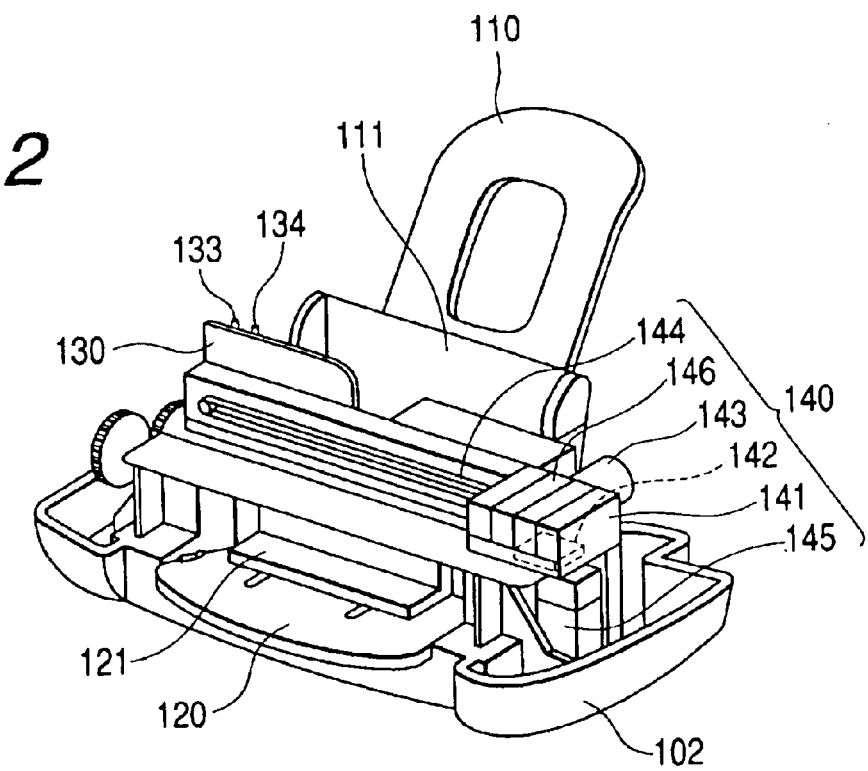
FIG. 2 is a perspective view showing the whole interior configuration of the ink jet printer, viewed from the front side when an upper housing is removed.
Figure 3:
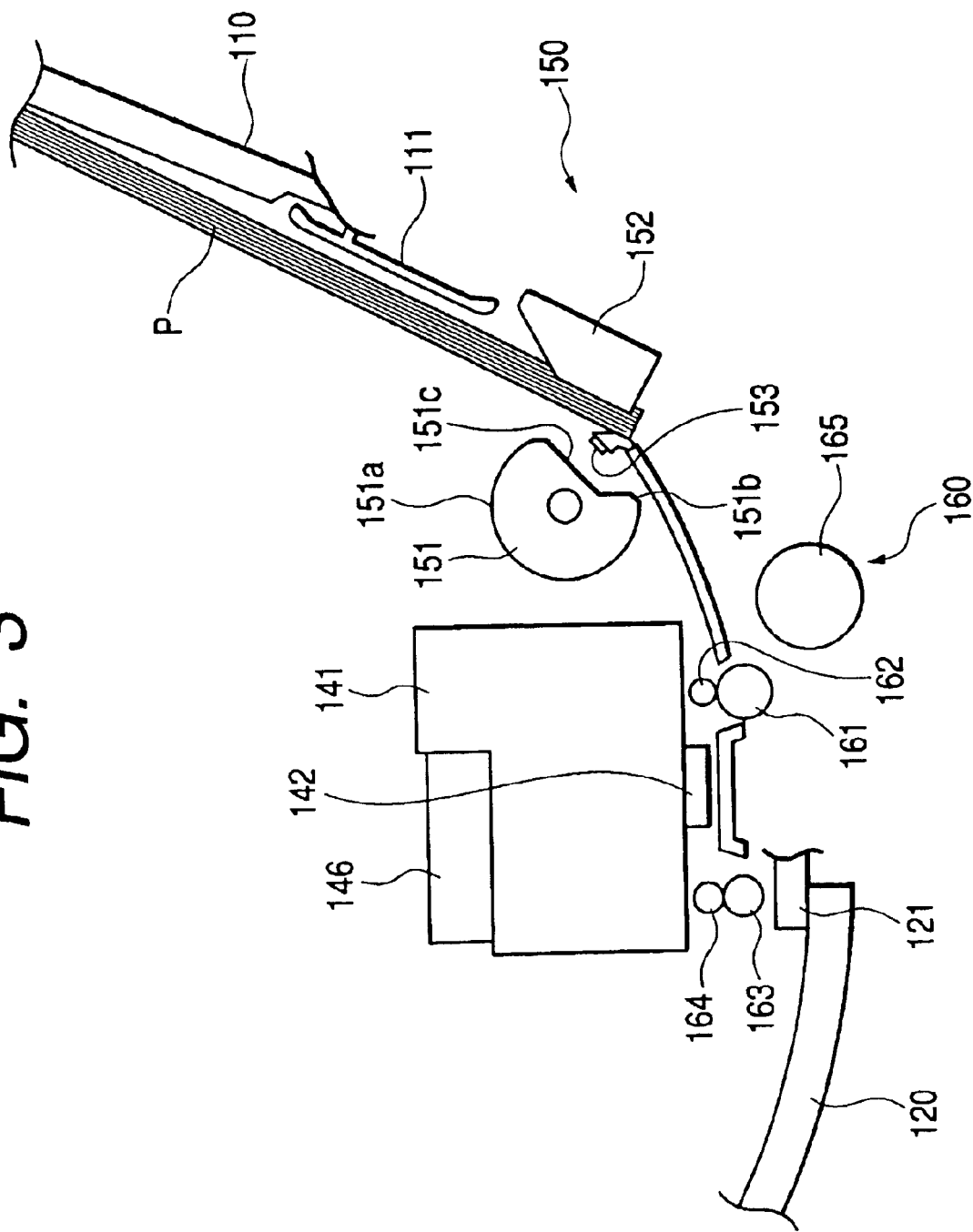
FIG. 3 is a sectional side view showing an essential part of the ink jet printer.

As shown in FIG. 2, in the lower housing 102, a control board 130 constituting a printer controller Is placed vertically, and a recording section 140 constituting a print engine, a sheet feeder 150 and a transporter 160 shown in FIG. 3 are installed.

A control element and a memory element such as CPU, ROM, RAM, ASIC (they are not shown), and other various circuit elements are mounted on the control board 130. At the upper end of the control board 130, light emitting diodes 133 and 134 are located protrusively, which emit lights respectively when the power switch 131 or the operational switches 132, 133 are pushed on, whereby a user can confirm switch-ON.

The recording section 140 comprises a carriage 141, a recording head 142, a carriage motor 143, a timing belt 144, and a suction pump 145. On a sheet transported by the transporter 160, data is recorded by the recording head 142 mounted on the carriage 141 scanned by the carriage motor 143 and the timing belt 144. From ink cartridges 146 of four colors, for example, yellow, magenta, cyan, and black, housed in the carriage 141, each color ink is supplied to the recording head 142 so that full color printing can be performed.

The feeder 150 comprises the sheet feeding tray 110, a sheet feeding guide 111, a sheet feeding roller 151, a hopper 152, and a separation pad 153. Sheets P stacked on the sheet feeding tray 110 and aligned by the sheet feeding guide 111 are pushed against the sheet feeding roller 151 with the separation pad 153 by rising of the hopper 152 with rotation of the sheet feeding roller 151, separated one by one from the uppermost sheet P, and transported to the transporter 160.

The transporter 160 comprises a feeding roller 161, a driven roller 162, a discharging roller 163, a serrated roller 164, a sheet feeding motor 165, and the stacker 120. The sheet P supplied from the feeder 150 is transported to the recording section 140 while being held between the feeding roller 161 driven by the sheet feeding motor 165 and the driven roller 162, and further transported to the ejected sheet stacker 120 while being held between the discharging roller 163 driven by the sheet feeding motor 165 and the serrated roller 164.

Figure 4:
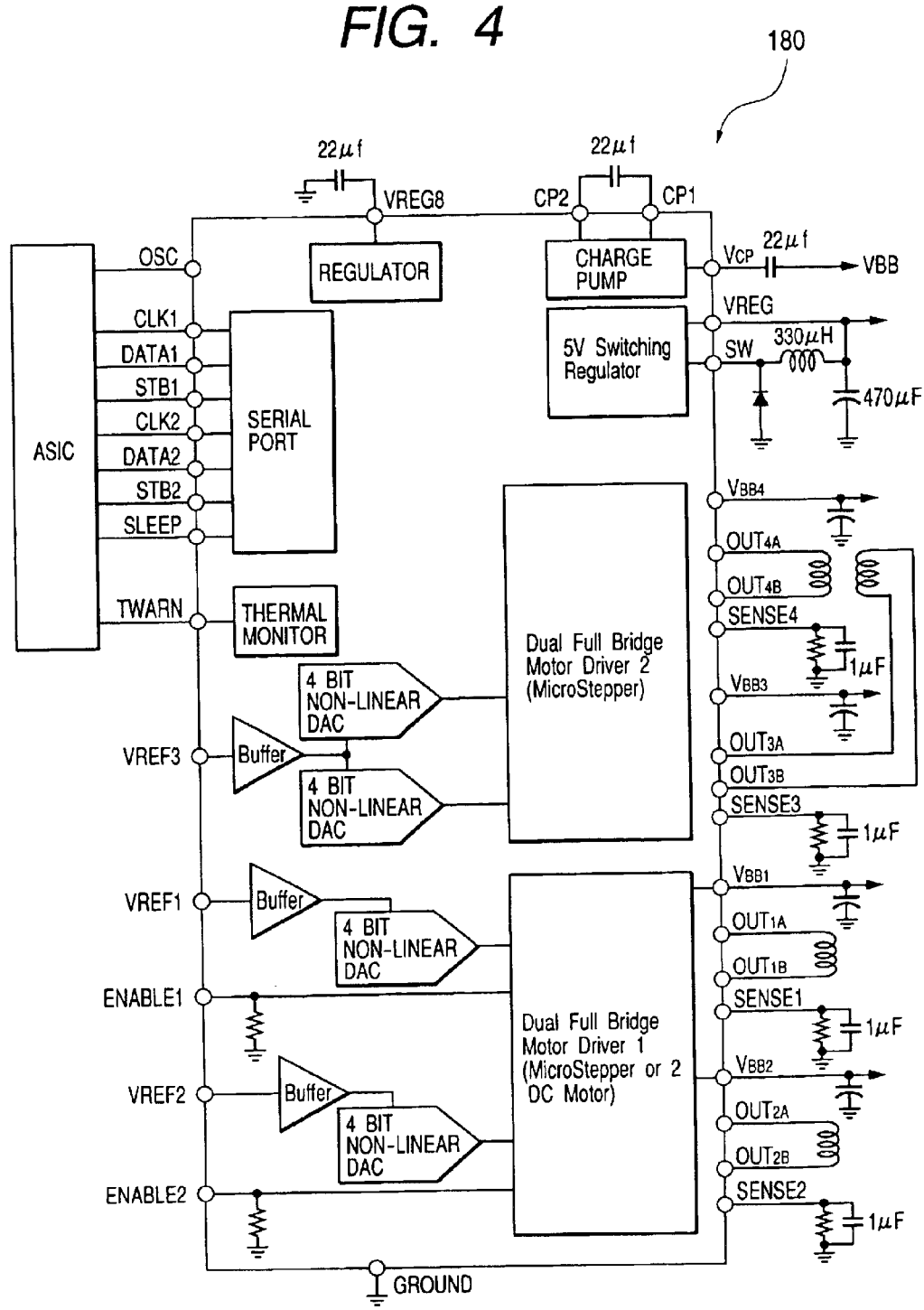
FIG. 4 is a block diagram showing a motor driver according to a first embodiment of the invention.

FIG. 4 shows a motor driver 180 for driving the carriage motor 143 and the sheet feeding motor 165, according to a first embodiment of the invention. The motor driver 180 constitutes a D/A converter which selects predetermined currents based upon a reference voltage VREF3 input from an external device. The motor driver 180 is mounted on the control board 130.

The motor driver 180 having such a configuration which fixes both of an angular interval and a magnitude of a synthetic vector obtained by current values of a A-phase and a B-phase at every microstep driving of the motor. The angular interval may be expressed by an angle between adjacent points on a vector locus (see FIG. 6) for one microstep driving of the motor.

FIG. 5A shows current values selected so that only the magnitude of the synthetic vector is made constant at every microstep driving position. FIG. 5B shows current values selected so that only the angular interval of the synthetic vector movement is made constant at every microstep driving position. FIG. 5C shows current values selected so that both of the magnitude and the angular interval are made constant at every microstep driving position. The values of VREF3 shown in FIG. 5C are common to FIGS. 5A and 5B.

Figure 6:
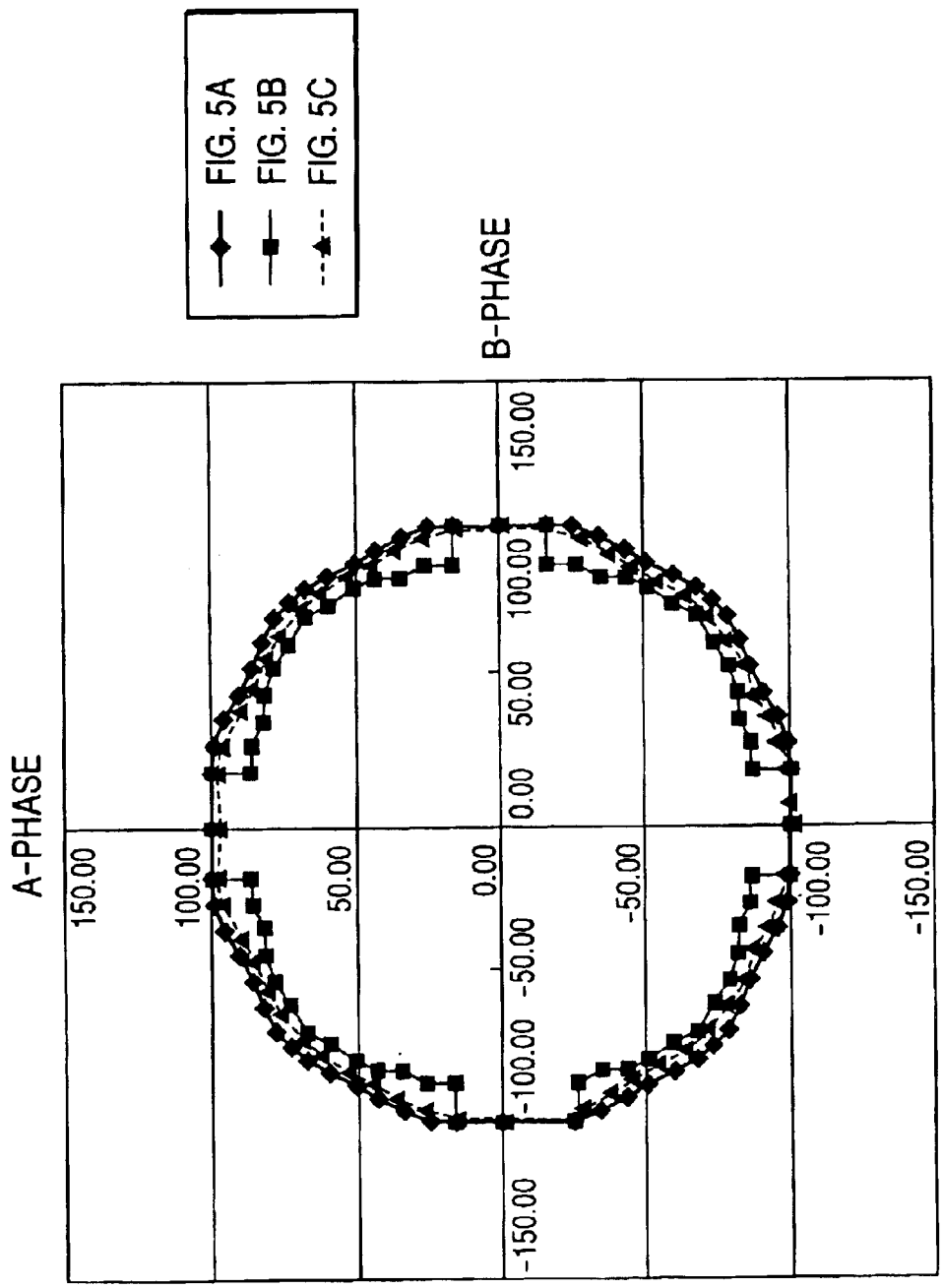
FIG. 6 shows relation between the current values of the A-phase and the B-phase shown in FIGS. 5A to 5C.

As shown in FIG. 6, the vector locus becomes a complete circle when the values are selected according to FIG. 5C, in comparison with cases when the values are selected according to FIG. 5A or 5B. The vector locus corresponding to FIG. 5B Is more preferable than that corresponding to FIG. 5A.

Figure 7:
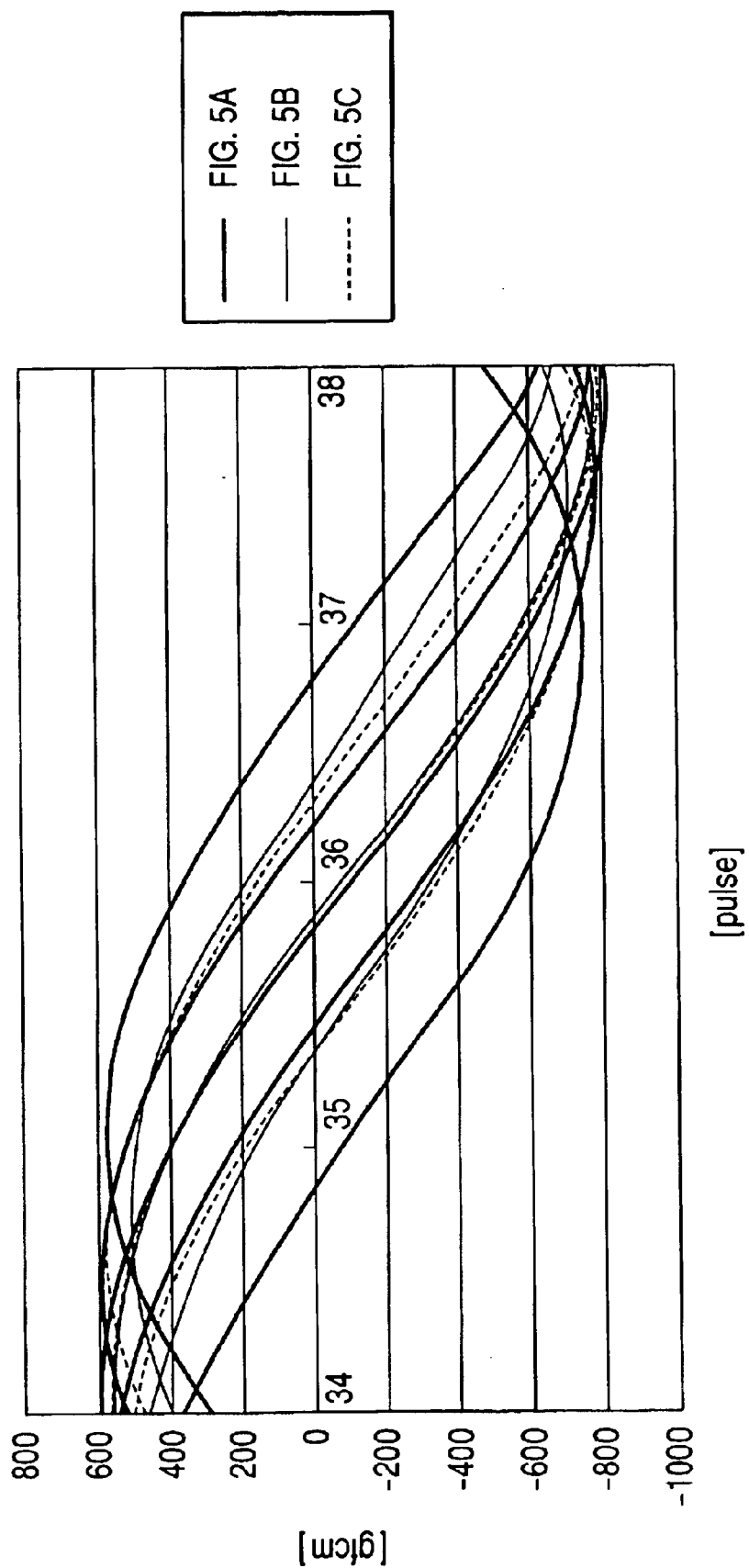
FIG. 7 shows a halt angle of a rotor in respective cases shown in FIGS. 5A to 5C.

As shown in FIG. 7, a halt position of the rotor at the two-phase position becomes more accurate when the values are selected according to FIG. 5C, in comparison with cases when the values are selected according to FIG. 5A or 5B. The halt position corresponding to FIG. 5B is more accurate than that corresponding to FIG. 5A Specifically, errors with respect to the halt position when the values are selected according to FIGS. 5A, 5B and 5C are 30%, 15% and 7.5%, respectively.

According to the above configuration, the halt angle of the rotor can be made accurate while enhancing the step resolution of the motor. The motor driver 180 may be configured such that either one of the magnitude and the angular interval of the synthetic vector is made constant. The motor driver 180 may be adopted so as to control a bipolar motor and a unipolar motor.

Figure 8:
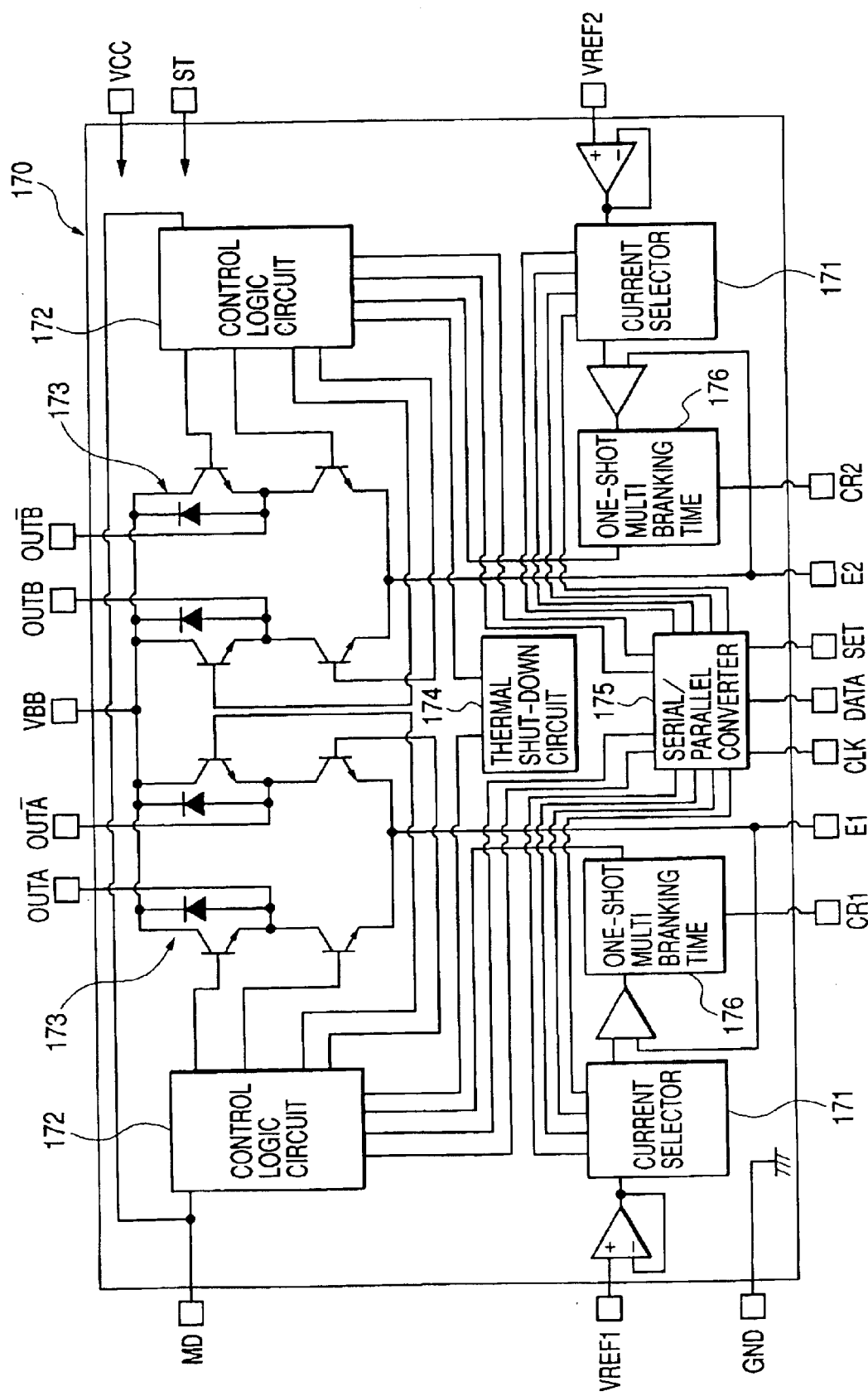
FIG. 8 is a block diagram showing a motor driver according to a second embodiment of the invention.

FIG. 8 shows a motor driver 170 for driving the carriage motor 143 and the sheet feeding motor 165, according to a second embodiment of the invention. The motor driver 170 is configured so that each current selector 171 selects a predetermined current value based upon a reference voltage VREF1 or reference voltage VREF2 input from each external device, and so that each control logic circuit 172 outputs a signal via each transistor 173 according to the selected current. The motor driver 170 further comprises a thermal shut-down circuit 174, a serial/parallel converter 175 and a one-shot multi blanking time 175. The motor driver 170 is mounted on the control board 130.

Figure 9:
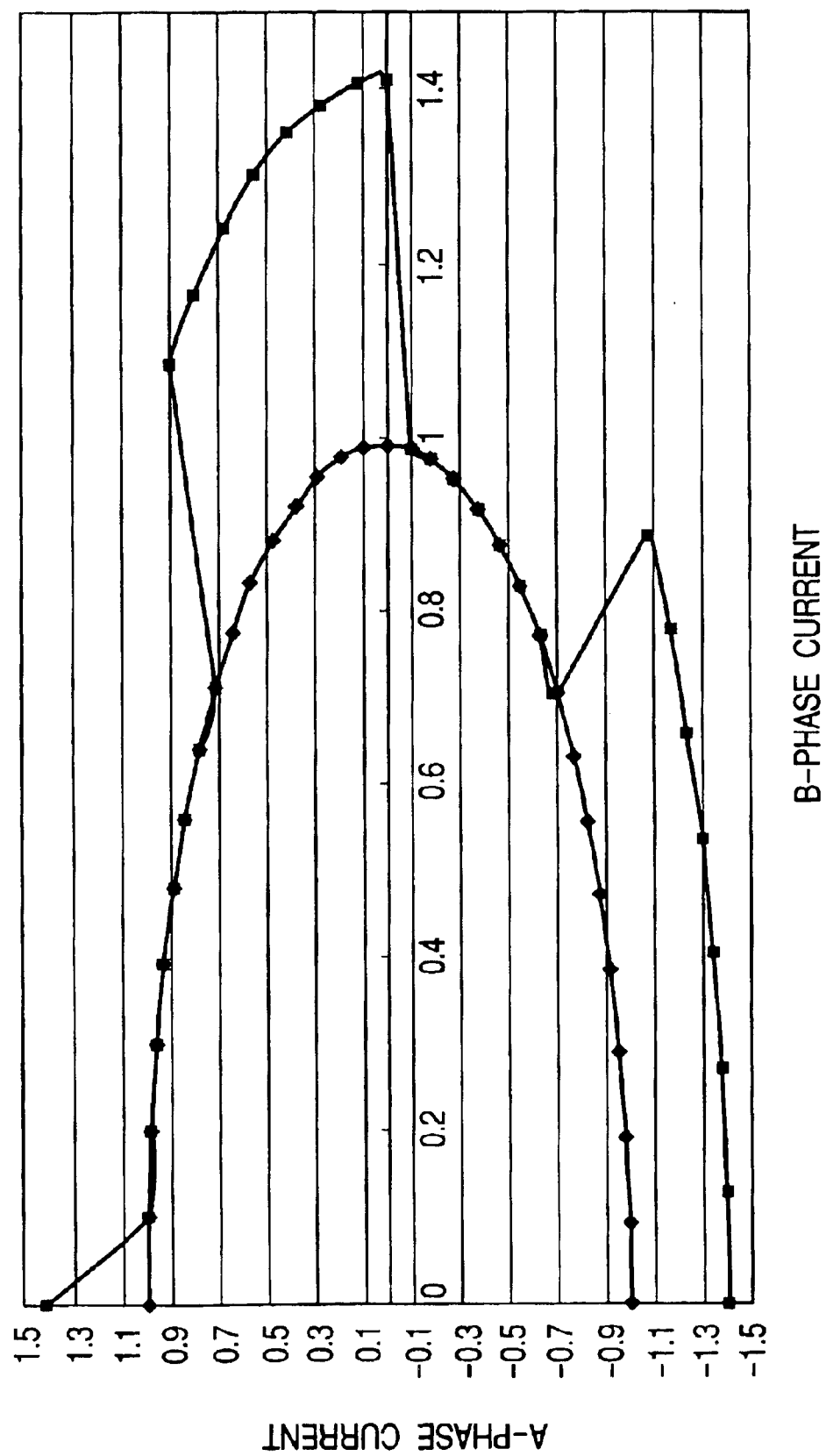
FIG. 9 shows relation between current values of a A-phase and a B-phase in the motor driver of FIG. 8.

The motor driver 170 having such configuration varies magnetic balance by increasing input current for one-phase excitation so as to produce a magnetic attraction force for overcoming the loss of torque (load imposed on the rotor) even when a rotor is in the one-phase excitation position. Specifically, the magnetic balance is varied by increasing a current value of a B-phase up to maximum 1.4 times between a two-phase excitation position (a position of 45 degrees in a first quadrant in FIG. 9) and a one-phase excitation position (on the axis of the B-phase in FIG. 9), while increasing a current value of an A-phase up to maximum 1.4 times between a two-phase excitation position (a position of −45 degrees in a fourth quadrant in FIG. 9) and a one-phase excitation position (on the axis of the A-phase in FIG. 9).

Figure 10:
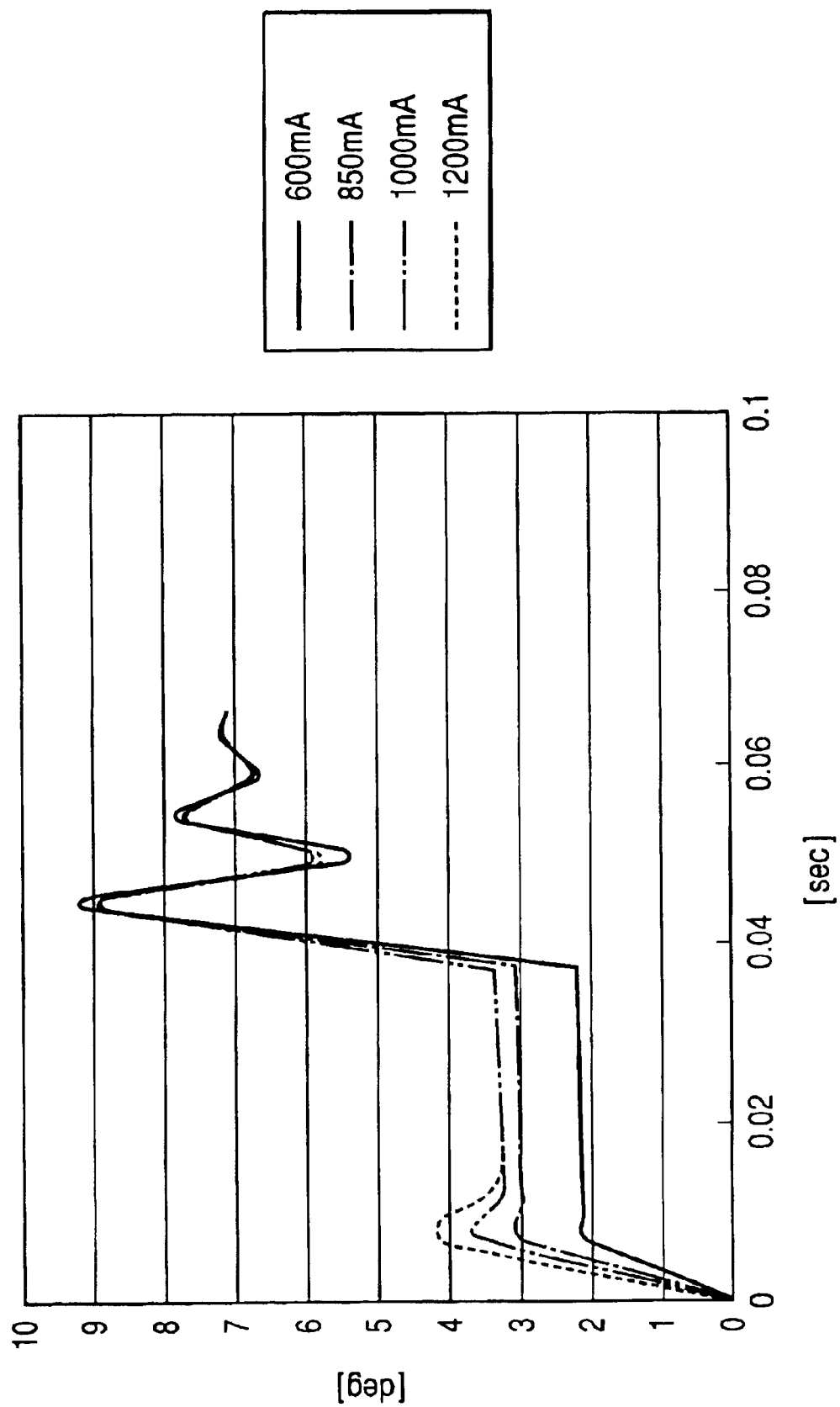
FIGS. 10 and 11 show a halt angle of a rotor realized by the motor driver of FIG. 8.

Hereby, as shown in FIG. 10, the precision of a halt angle at the one-phase excitation position between adjacent a two-phase excitation position can be enhanced as input current for one-phase excitation is increased up to 600 mA, 850 mA, 1000 mA and 1200 mA. Concretely, each halt angle when each input current for one-phase excitation is 600 mA, 850 mA, 1000 mA and 1200 mA is 2.15 degrees, 3 degrees, 3.25 degrees and 3.3 degrees, each precision for a reference value 3.75 degrees is 43%, 20%, 13% and 12% and the precision is enhanced.

As described above, as a magnetic attraction force for overcoming the loss of torque can be also exercised in the one-phase excitation position, the halt angle of the rotor can be precise while enhancing the step resolution of the motor. The motor driver 170 may be configured such that the magnetic balance is varied by decreasing the input current for two-phase excitation to balance the magnetic attraction force at the one-phase excitation position and that at the two-phase excitation position. Also, the motor driver 170 may be configured such that the magnetic valance is varied by increasing the input current for one-phase excitation while decreasing the input current for two-phase excitation to balance the magnetic attraction force at the one-phase excitation position and that at the two-phase position. The motor driver 170 may be adopted to control a bipolar motor and a unipolar motor.

Figure 11:
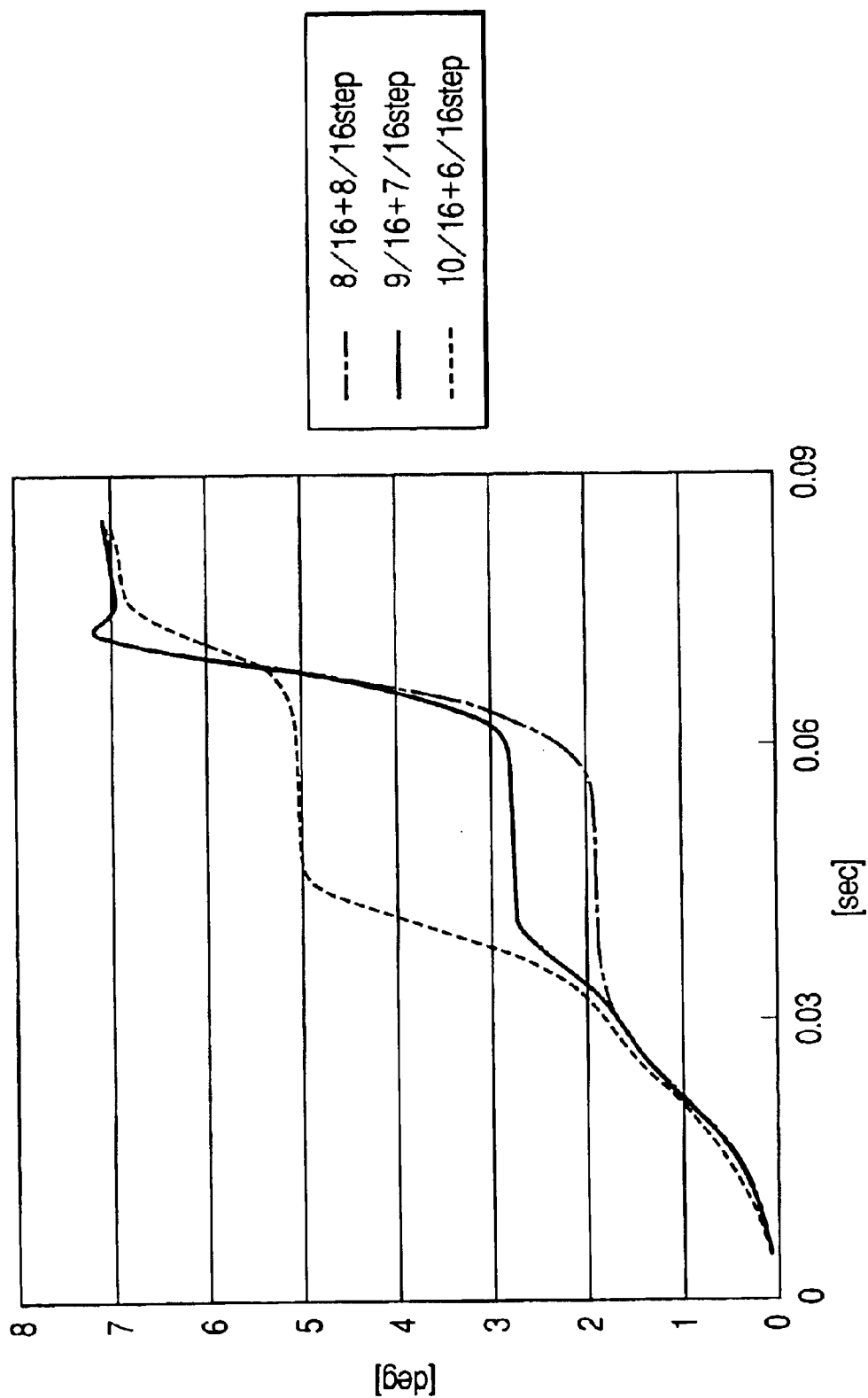

The motor driver 170 may be configured such that a direction of a synthetic vector of an A-phase current value and a B-phase current value at the one-phase excitation position is corrected by increasing the number of driving pulse for one-phase excitation. Specifically, as shown in FIG. 11, in a case where the number of driving pulse for one-phase excitation is increased from 8 to 9 (while decreasing the number of driving pulse for two-phase excitation from 8 to 7), the precision of the halt angle with respect to the reference value (3.75 degrees) is improved. Since the precision is deteriorated when the number of driving pulse for one-phase excitation is increased from 8 to 10, the increased number of pulse should be properly selected.

Since the direction of the synthetic vector at the one-phase excitation position can be corrected, the halt angle of the rotor can be made accurate while enhancing the step resolution of the motor.

The motor driver 170 may be configured such that the direction of the synthetic vector at the one-phase excitation position is corrected by a damping operation for forwardly rotating by the predetermined number (for example, two) of pulses for one-phase excitation, reversely rotating by the predetermined number of pulses (for example, three) and normally rotating by the predetermined number of pulses (for example, two). The motor driver 170 may be adopted to control a bipolar motor and a unipolar motor.

Figure 12:
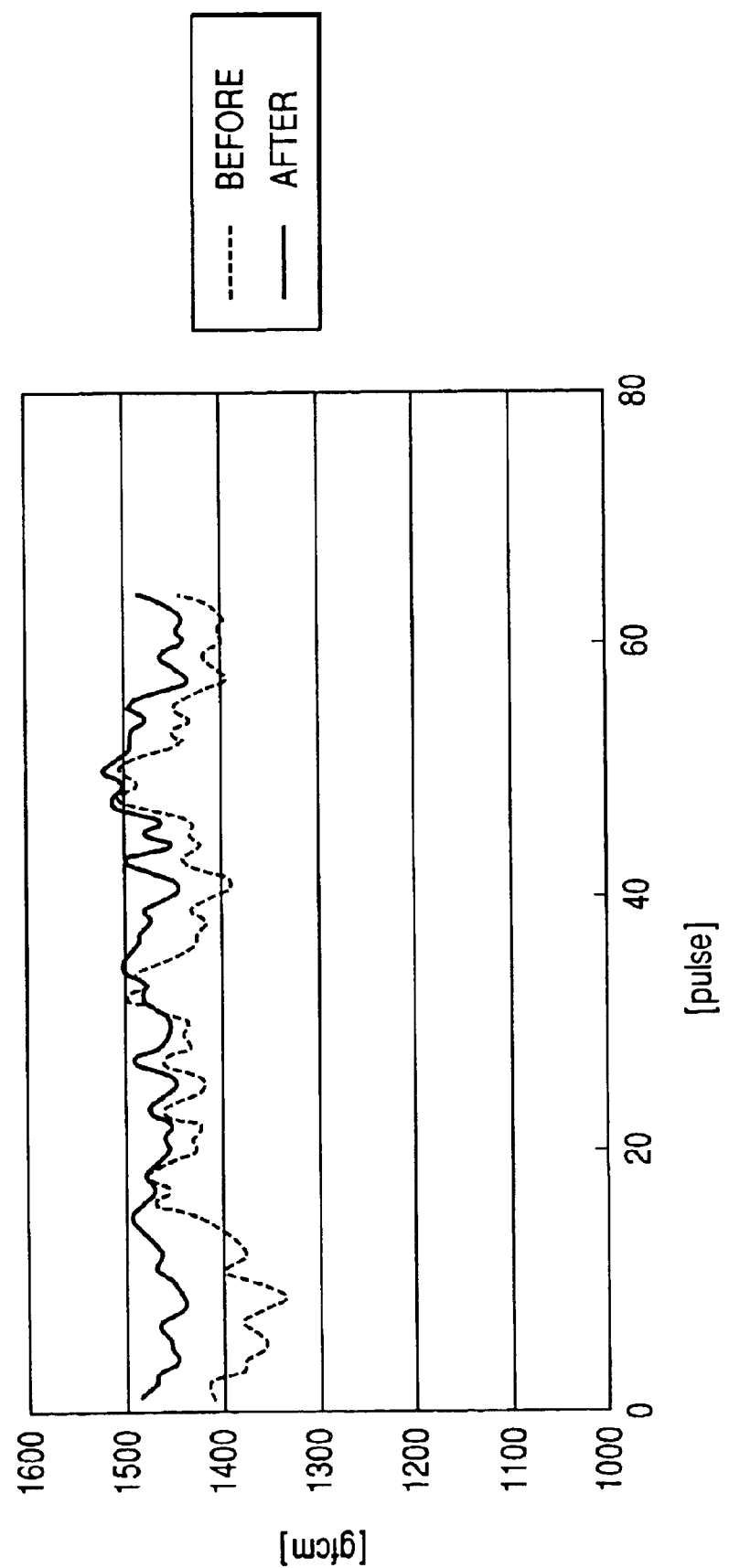
FIG. 12 is a graph showing torque variations for 64 steps of driving before and after correction according to the invention is performed.
Figure 13:
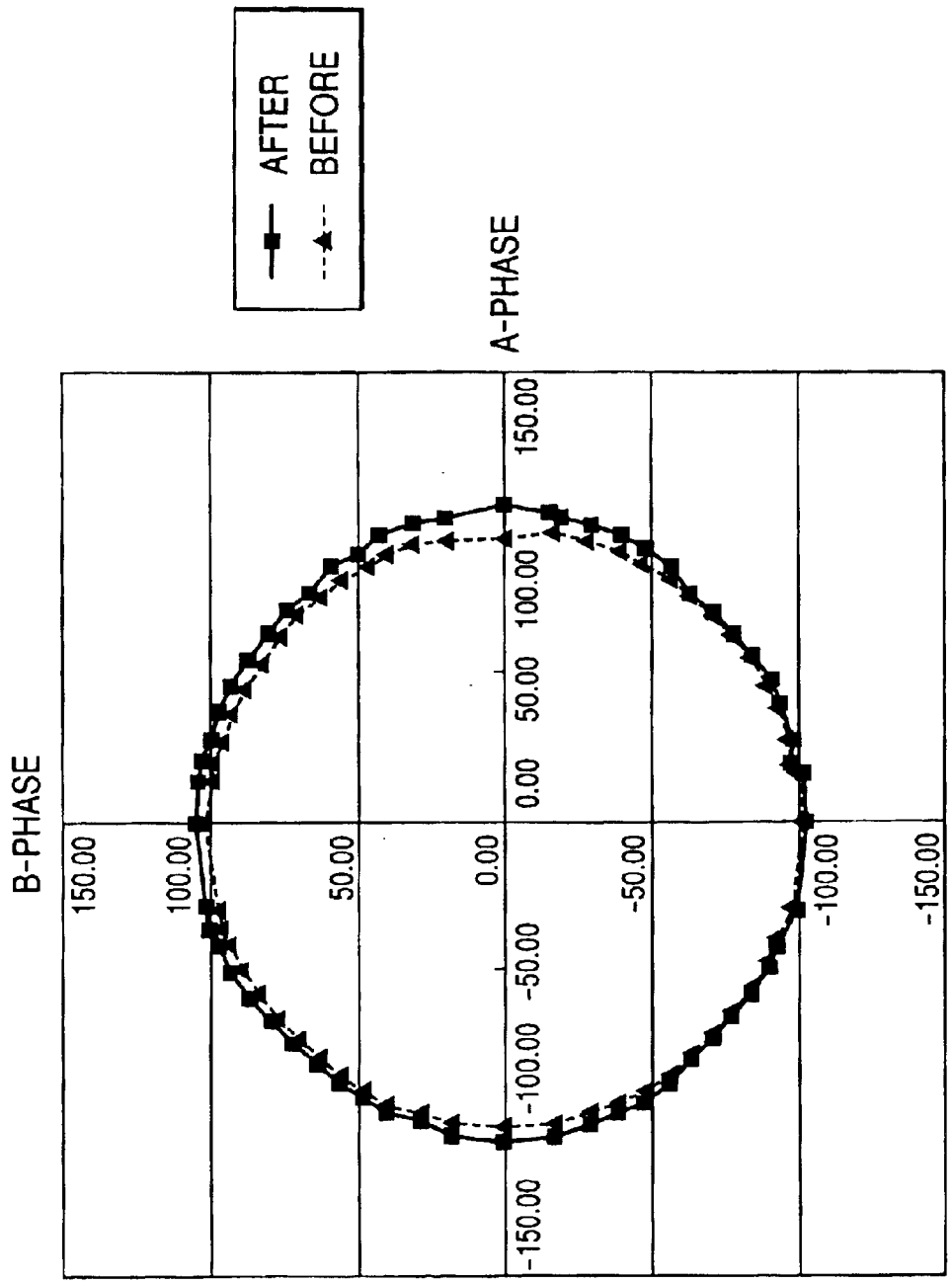
FIG. 13 is a graph showing current rates for 64 steps of driving before and after the correction is performed.
Figure 14:
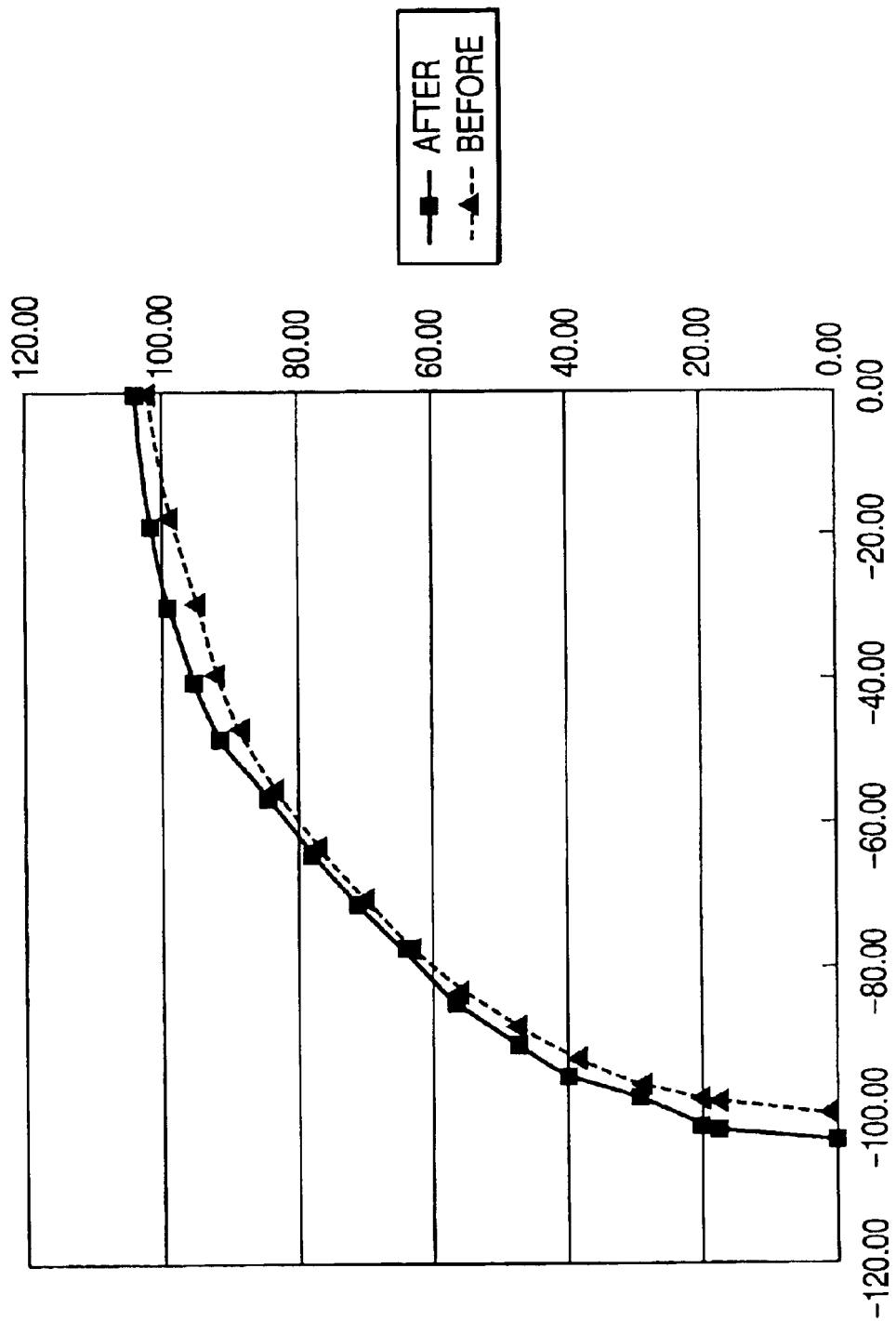
FIG. 14 is a partial enlarged view of FIG. 13.
Figure 16:
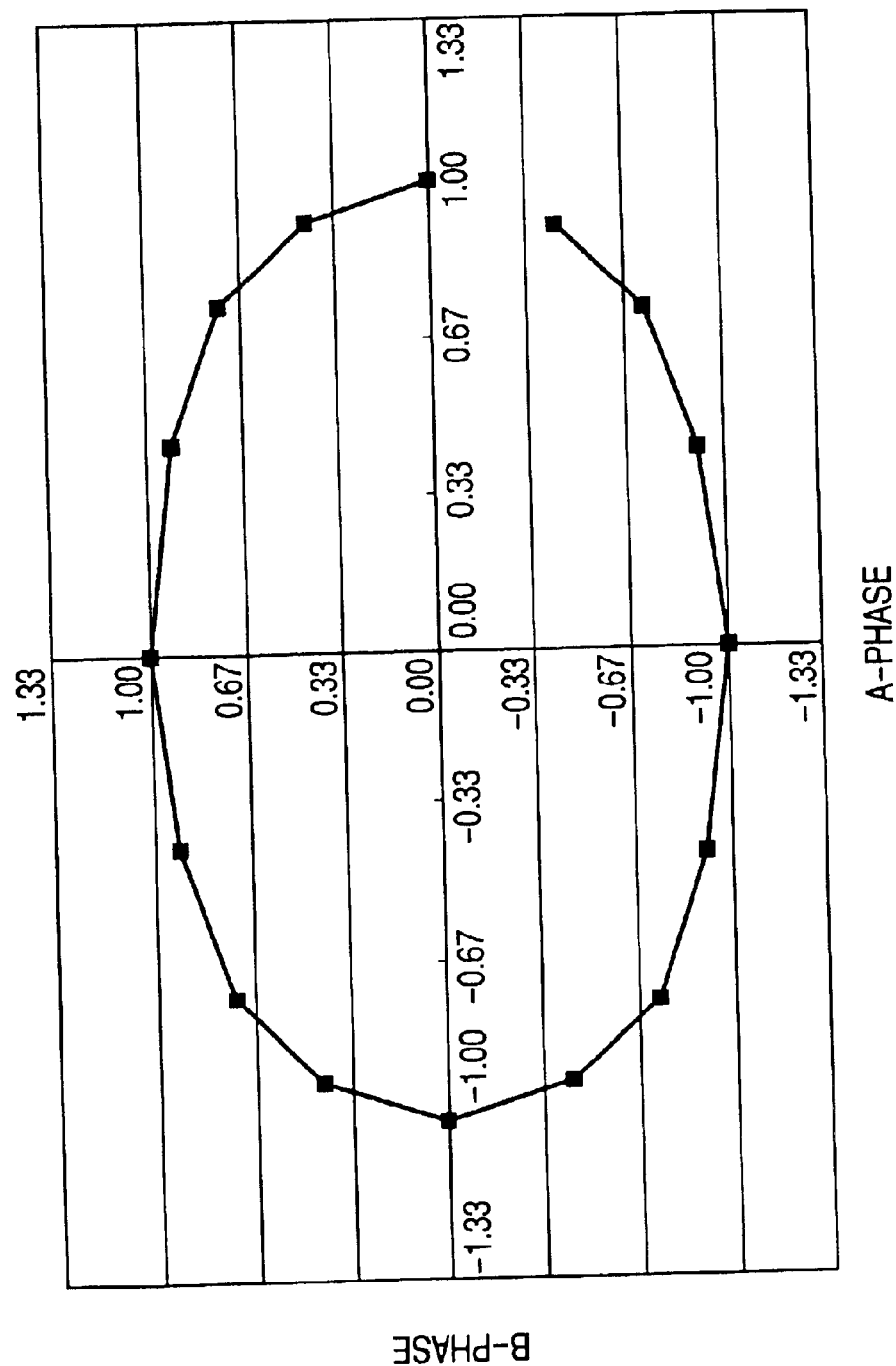
FIG. 16 shows relation between current values of a A-phase and a B-phase in a related-art motor.
Figure 17:
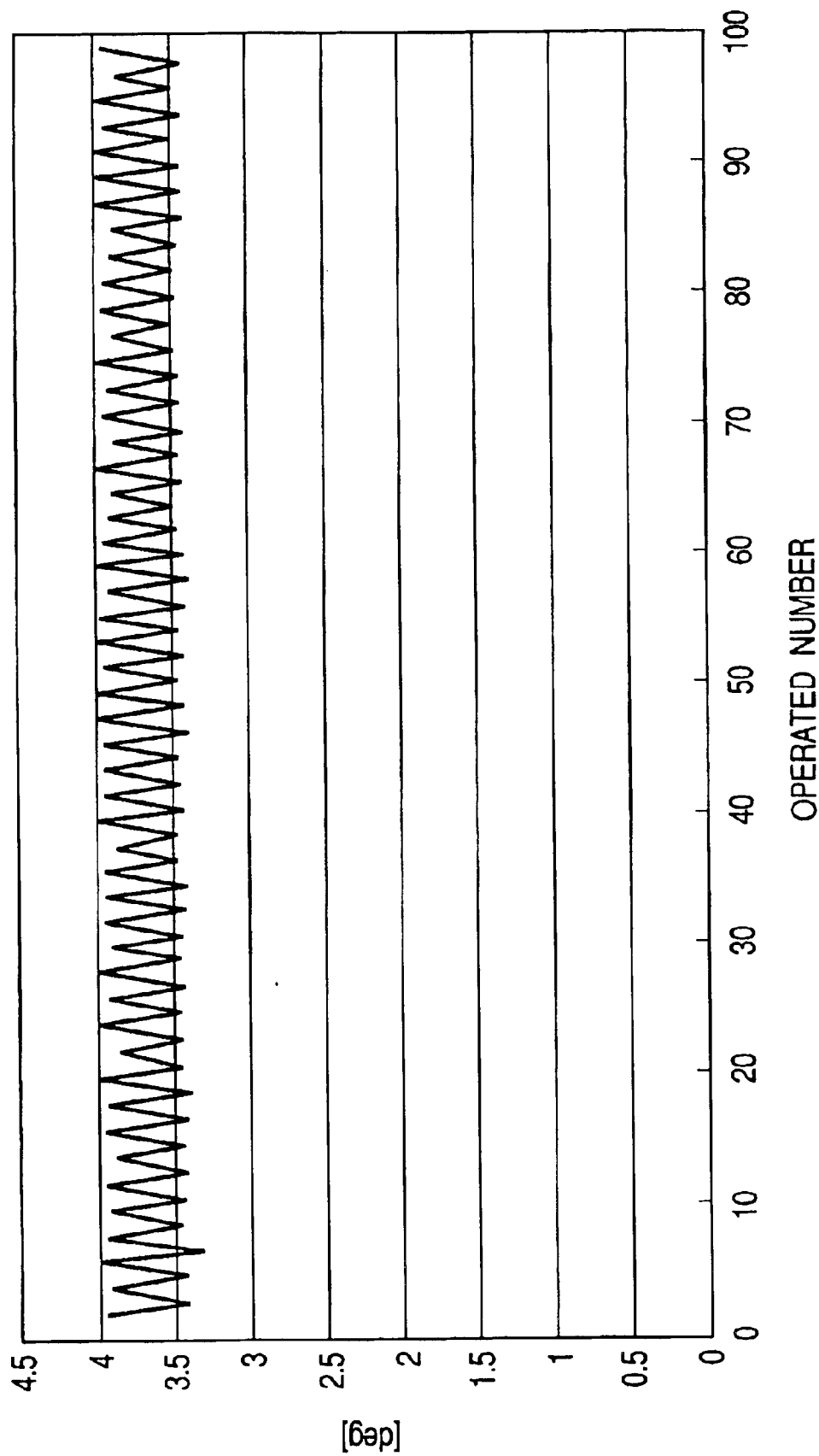
FIG. 17 shows the precision of a halt angle of a rotor in the related-art motor.

Next, referring to FIGS. 12 to 14, a method of controlling the minute correction of the position of a step angle by controlling exciting current in an exciting phase, utilizing the above-mentioned embodiments will be described.

First, to check whether a step angle is satisfactory or not, the variation of torque is checked, the output torque is decreased when it is large, while the output torque is increased when it is small. That is, the deviation from a target value at every microstep driving position is corrected as shown in FIG. 12. The dashed line represents values before the correction is performed, and the solid line represents valued after the correction is performed.

Next, the output torque in the case of one-phase excitation of the A-phase and that of the B-phase are balanced. Specifically, the current values of the A-phase and the B-phase are corrected from those represented by the dashed line to those represented by the solid line shown in FIGS. 13 and 14. Finally, it is again confirmed whether the output torque at every microstep driving position is substantially made constant.

Though the invention has been described in the above various embodiments, it is not limited the above embodiments but may be applied also to other embodiments within the scope of the appended claims. For example, though the ink jet printer has been described as an example of a recording apparatus, the invention is not limited to this but can be applied to another recording apparatus having a discharging roller, for example, a thermal transfer type printer, and an ink jet type or thermal transfer type facsimile or copying machine.

What is claimed is:

1. A motor driver, comprising:

a first current supplier, which supplies a first current to a first phase coil of a motor;

a second current supplier, which supplies a second current to a second phase coil of the motor; and a current selector, which selects a value of the first current and a value of the second current, so as to make constant at least one of:

a magnitude of a synthetic vector obtained by the selected value of the first current and the selected value of the second current at every microstep driving step of the motor, and an angular interval between synthetic vectors corresponding to adjacent microstep driving steps of the motor.

2. A motor driver as set forth in claim 1, used in a recording apparatus to drive a first motor, which moves a carriage on which a recording head is mounted, and a second motor, which transports a recording medium on which the recording head performs recording.

3. A motor driver, comprising:

a first current supplier, which supplies a first current to a first phase coil of a motor;

a second current supplier, which supplies a second current to a second phase coil of the motor, and a current selector, which performs at least one of:

increasing one of the first current and the second current for one-phase excitation to vary a magnetic balance obtained by the first current or the second current; and decreasing both of the first current and the second current for two-phase excitation to vary a magnetic balance obtained by the first current and the second current.

4. A motor driver as set forth in claim 3, used in a recording apparatus to drive a first motor, which moves a carriage on which a recording head is mounted, and a second motor, which transports a recording medium on which the recording head performs recording.

5. A motor driver, comprising:

a first pulse supplier, which supplies first pulses for microstep-driving a rotor of a motor to place at a one-phase excitation position;

a second pulse supplier, which supplies second pulses for microstep-driving the rotor to place at a two-phase excitation position; and a drive controller, which controls the first pulse supplier and the second pulse supplier so as to perform at least one of:

increasing the number of the first pulses to be supplied during a predetermined cycle; and decreasing the number of the second pulses to be supplied during the predetermined cycle.

6. A motor driver as set forth in claim 5, used in a recording apparatus to drive a first motor, which moves a carriage on which a recording head is mounted, and a second motor, which transports a recording medium on which the recording head performs recording.

* * * * *